M. J. TOWNS.
STORAGE BATTERY.
APPLICATION FILED APR. 8, 1921.

1,433,669.

Patented Oct. 31, 1922.
2 SHEETS—SHEET 1.

INVENTOR.
MATTIE J. TOWNS
BY
ATTORNEY.

WITNESSES

M. J. TOWNS.
STORAGE BATTERY.
APPLICATION FILED APR. 8, 1921.
1,433,669.
Patented Oct. 31, 1922.
2 SHEETS—SHEET 2.
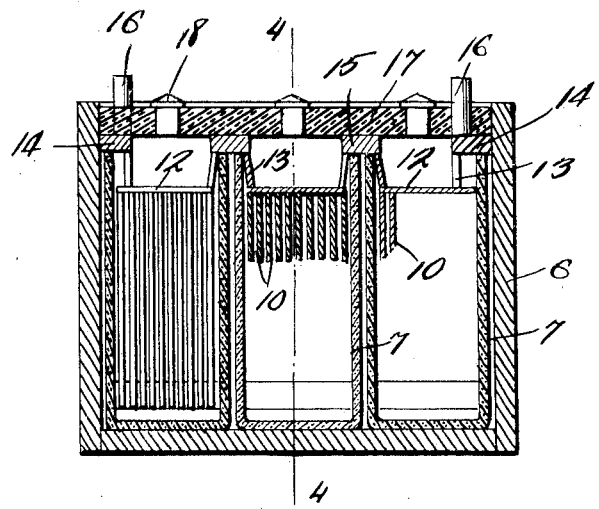
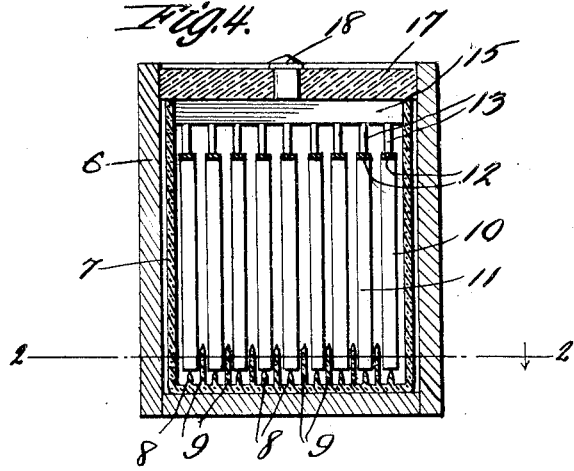
MATTIE J. TOWNS INVENTOR.
WITNESSES
BY
ATTORNEY.

Patented Oct. 31, 1922.

1,433,669

UNITED STATES PATENT OFFICE.

MATTIE J. TOWNS, OF TYLER, TEXAS.

STORAGE BATTERY.

Application filed April 8, 1921. Serial No. 459,549.

*To all whom it may concern:*

Be it known that I, MATTIE J. TOWNS, citizen of the United States, residing at Tyler, in the county of Smith and State of Texas, have invented certain new and useful Improvements in Storage Batteries, of which the following is a specification.

This invention relates to new and useful improvements in storage batteries, and more particularly to the type used in automobiles for starting and lighting purposes.

An important object of the invention is to provide a storage battery embodying a new and novel arrangement of the electrodes or plates whereby elimination of the usual wooden separators between the plates is effected without detrimental effects upon the battery. Other objects accomplished by the new arrangement of plates and manner of connecting the same are that, the plates will not become short circuited, the battery will take a charge in less time than the ordinary battery, the plates will not warp, the battery can be shipped and stored dry on account of elimination of the wood or composition separators, it can be disassembled and assembled with ease and in a minimum amount of time due to the fact that no breaking of connections in disassembling or no lead burning in reassembling is necessary, the arrangement of the plate assemblies and their small size permits a free circulation of the electrolyte and allows uninterrupted settlement of the disintegrated active material, and the battery has a higher amperage than the ordinary battery.

Other objects and advantages of the invention will become apparent during the course of the following description.

In the accompanying drawing forming a part of the application and wherein like numerals are employed to designate like parts throughout the several views, Figure 1 is a plan of the battery with the cover removed, Figure 2 is a longitudinal horizontal section of the battery, Figure 3 is a longitudinal vertical section of the same, Figure 4 is a transverse section of the battery, Figure 5 is a perspective view of the same.

Referring now to the drawings wherein for the purpose of illustration is shown the preferred embodiment of my invention, the numeral 6 indicates the ordinary wooden outer case forming means for holding and protecting the jars 7 in each of which is made a cell of the battery. As each jar is of identically the same construction, a description of one will suffice for all. On the bottom of each jar is formed a plurality of transversely extending ribs which alternate in height throughout the length of the jar as most clearly seen in Figure 4. The shortest ribs 8 I will term the plate supporting ribs while the taller ribs 9 one of which is arranged between each pair of plate supporting ribs, I will designate as plate separating ribs. It will of course be obvious that these ribs 8 and 9 extend entirely across the jar and that electrolyte, usually consisting of a sulphuric acid solution, is contained in each jar.

The electrodes or plates of like sign are grouped in separate and distinct rows extending transversely across the jar from the plate supporting ribs 8 to approximately the top of the jar. The plates in each row are arranged in juxtaposition, or in other words arranged face to face and as one row of elements are all of a like sign, all plates in the adjacent row are of the opposite sign and consequently the plates of opposite sign are arranged edge to edge.

I have indicated the negative plates with the numeral 10 and the positive plates with the numeral 11. In the present instance, I have illustrated each row of plates as consisting of 10 separate plates and each jar as being provided with 9 rows of plates, 5 negative rows and 4 positive rows, but of course it will be understood that I do not limit myself as to the number of rows or the number of plates in each row. However, as indicated by the number of rows illustrated in the present instance, it will be appreciated that the plates are relatively narrow, thereby providing for the efficient circulation of the electrolyte and the operation of all surfaces of the plates of opposite signs.

By referring to Figure 4 of the drawings, it will be apparent that the bottoms of the various rows in each jar are separated by the relatively tall ribs 9 consequently any tendency of the lower ends of the plates of one sign to twist or buckle to touch the plates of the opposite sign, is prevented by these ribs 9. The purpose of the ribs 8 is of course obvious to those skilled in the art.

As best seen in Figures 3 and 4, a strap 12 connects the upper edges of the plates comprising a row and rising from each connecting strap 12 is a connector member 13. For connecting the row or groups of elements of like sign in each jar and for connecting the rows of elements of unlike sign in adjacent jars, a plurality of bars 14 are connected to the upstanding connectors 13 in a particular manner. These bars 14 four of which are provided in the present instance, in the three cell type of battery, extend longitudinally of the jars and rest upon the upper edges thereof. A separate bar 14 is provided for all the positive plates in one end jar and a separate bar for the negative plates in the other end jar. A pair of bars 15 are positioned upon the contiguous longitudinal edges of the jars as clearly seen, and the rows of elements of one sign in one jar are connected by means of the connectors 13 to one of said bars while the rows of elements of opposite sign in the adjacent jar are connected to the same bar. Consequently, as stated before, the connectors 13 connect to the straps 12 of the various rows to the bars 14 and 15 and are burned thereto for a purpose well understood. From the foregoing description, it will be apparent that the battery will have one more bar than there are cells in the battery i. e. a three cell battery will have four bars, a six cell, seven bars and so on. Each end bar 14 is provided with an upstanding terminal post 16 to which lead wires are connected in the ordinary manner.

A cover for the battery is indicated by the numeral 17 and is provided with a pair of openings to provide for the projection therethrough of the terminal posts 16. This cover is adapted to rest upon the connecting bars 14 and 15 in such a manner that it is flush with the top edges of the outer wooden case 6. The cover is also provided with suitable vents 18, three being provided in the present instant, one for each cell.

From the foregoing description and arrangement of the plates or elements of opposite signs, it will be obvious that said plates of opposite signs are arranged edge to edge and consequently it will be practically impossible for the elements of one sign to touch those of the opposite sign. Furthermore, such action of the plates would be prevented by the separator ribs 9 and the connectors 13, the latter bracing the upper ends of the plates. Furthermore, as all the plates in one row are of like sign, the necessity of using the separators between the plates is avoided and therefore the expense of manufacturing the battery is reduced to a considerable extent, beside overcoming the undesirable consequences incident to defective separators. As the plates are relatively narrow, there will be considerable increase in the area of the ends of the plates exposed to the electrolyte, and the electrolyte will have a free and unrestricted circulation between and around the plates and groups of plates.

Due to the fact that the connectors are disposed interiorly of the cover in the present type of battery, it will be obvious that the battery may be readily repaired without breaking any connections as the cover may be lifted off of the terminal posts 16 after the lead wires have been disconnected therefrom without the removal of other parts. After this cover has been removed access to any of the cells is easily had, and the plates in all of the jars may be removed as a unit by lifting the bars 14 and 15.

The foregoing description and accompanying drawings have reference to what might be considered to be the approved or preferred form of my invention. I desire it to be understood that I may make such changes in the construction, combination and arrangement of parts materials, dimensions, etc., as may prove expedient and fall within the scope of the appended claims.

Having thus described my invention what I claim as new and desire to secure by Letters Patent is:

1. In a storage battery cell, the combination of a vessel, elements in said vessel, means projecting upward within the cell for spacing the elements from the bottom of the vessel, and also independent means for separating the plates of opposite polarity, said means projecting a substantial distance between the plates to prevent buckling of the lower portions of the plates.

2. In a storage battery cell, the combination of a vessel, elements in said vessel, ribs integral with the vessel and projecting upward within the cell for spacing the lower ends of the elements from the bottom of the vessel, independent means also integral with the vessel projecting upward between said spacing means for separating the plates of opposite polarity, said separating means projecting a substantial distance between the plates and above the tops of said ribs to prevent buckling of the lower portions of the plates.

In testimony whereof I affix my signature in presence of two witnesses.

MATTIE J. TOWNS.

Witnesses:
WM. D. BICKLEY,
W. D. CRAWFORD.